Figure 1:
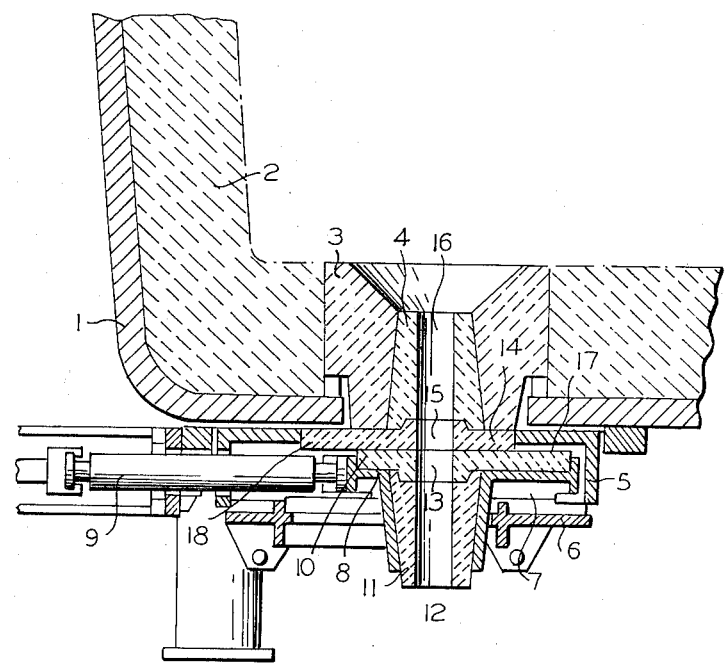

United States Patent [19]

Meier

[11] 3,712,518

[45] Jan. 23, 1973

[54] SLIDING GATE NOZZLE FOR VESSELS USED FOR POURING METALS

[75] Inventor: Ernst Meier, Adliswil, Zurich, Switzerland

[73] Assignee: Interstop AG, Zug, Switzerland

[22] Filed: Oct. 1, 1970

[21] Appl. No.: 77,198

[30] Foreign Application Priority Data

Oct. 13, 1969 Germany..................P 19 51 447.7

[52] U.S. Cl.................................................222/561
[51] Int. Cl. ..............................................B67d 3/00
[58] Field of Search..222/DIG. 7, 561, 559; 164/337; 239/489, 590; 137/329.02, 322, 329, 329.03, 329.04, 329.05, 329.06

[56] References Cited

UNITED STATES PATENTS

| | | | |
|---|---|---|---|
| 3,581,948 | 6/1971 | Detalle | 222/DIG. 7 |
| 3,454,201 | 7/1969 | Fichera | 222/561 X |
| 3,567,082 | 3/1971 | Tinnes | 222/DIG. 7 |
| 2,643,090 | 6/1953 | Cluphf | 137/329.02 |
| 3,511,261 | 5/1970 | Bick et al. | 222/DIG. 7 |
| 3,587,945 | 6/1971 | Lanatti et al. | 222/561 X |
| 3,501,068 | 3/1970 | Shapland | 222/561 X |
| 3,352,465 | 11/1967 | Shapland | 222/DIG. 7 |
| 3,501,068 | 3/1970 | Shapland | 222/DIG. 7 |
| 1,311,841 | 7/1919 | Parker | 239/489 X |
| 1,469,479 | 10/1923 | Kent | 239/489 X |

Primary Examiner—Samuel F. Coleman
Assistant Examiner—Norman L. Stack
Attorney—Wenderoth, Lind & Ponack

[57] ABSTRACT

A sliding gate assembly for a vessel used for pouring metals containing replaceable refractory wearing parts. A casing has an outlet and an entry bush therein. A stationary bedplate is fixed to the casing having a first orifice aligned with the outlet. A sliding plate has a second orifice controlling the first orifice. An exit bush is connected to the sliding plate. The orifices in the bed plate and in the sliding plate are offset from the longitudinal centers of the plates and the two plates have cooperating sealing faces for closing the cooperating orifices located at the longer ends of the two plates. A boss is provided at the orifice in each of the plates on the side facing away from the sealing face of the plate and the entry bush and the exit bush associated with the plates have a socket for receiving the boss associated therewith.

1 Claim, 4 Drawing Figures

INVENTOR
ERNST MEIER

SLIDING GATE NOZZLE FOR VESSELS USED FOR POURING METALS

The invention relates to a sliding gate nozzle for vessels used for pouring metals, particularly steel, incorporating replaceable refractory wearing parts comprising an entry bush in the outlet opening of the vessel and a bedplate as well as a sliding plate and an exit bush in the movable part of the gate.

In such sliding gate nozzles the wearing parts in the outlet opening and in the sliding gate are exposed to considerable wear by the teeming liquid metal and must be frequently replaced to ensure that the gate remains tight in operation. In conventional forms of construction the wearing parts comprise an entry bush usually fitted into an orifice brick forming the outlet opening from the pouring vessel above a bedplate, as well as a movable sliding plate cooperating with the bedplate to form a sealing closure, and an adjoining exit bush which participates in the movements of the sliding plate. Conventional plates have orifices that are coaxial with the bores of the bushes and their sides facing the bushes are smooth and make flush contact with them. The orifice in the bedplate is usually in or nearly in the center of the plate.

In modern foundries the refractory portions of such sliding gate nozzles in the ladles used for instance for continuous casting are subjected to very considerable wear. This is primarily the result of the very long pouring times from ladles that may hold up to 300 tons of steel and wear may also be due to the high rates of flow of the liquid metal under considerable ferrostatic heads. These high stresses to which the wearing parts of a sliding gate nozzle are exposed necessitate the employment of expensive refractory materials of the highest ceramic quality, principally of a kind having an alumina content up to 90 percent. Even in such a case wear is still so high that it is rarely possible to use the plates forming the gate for more than a single ladle charge.

The short period of use of these parts is also dictated by considerations of safety which require the prevention of leakage and breakout of the steel.

In such sliding gate nozzles wear occurs primarily at the butt faces respectively at the joints between the entry bush and the bedplate as well as between the sliding plate and the exit bush. It also affects principally the cooperating sliding faces of the stationary bedplate and of the movable sliding plate. These wearing parts are therefore appropriately dimensioned, i.e., a relatively high expenditure of high grade refractory material is accepted as unavoidable for the sake of ensuring the required degree of safety in operation. If the dimensions of the wearing parts, for instance the thickness and length of the bedplate and sliding plate are reduced to economical dimensions, then the abutting faces of the bushes and plates will be located in zones of turbulent flow of the liquid metal in the partly closed gate.

Moreover, a reduction of the length of the plates, particularly when the orifices are in the middle of the plates causes the distances between entry and exit of the sliding gate nozzle when the gate is closed to be less, and erosion of the sliding surfaces of the plates then leads to leakage or breakthrough of metal from entry to exit.

It is the object of the present invention to overcome all of these defects and to ensure the operating safety of the sliding gate nozzle while bringing about a saving in refractory wearing material by employing relatively simple technical means.

According to the invention these objects are substantially achieved in that a. the orifices for the flowing metal in the bedplate and in the sliding plate are offset from the longitudinal centers of the plates, b. the sealing faces for closing the orifices are on the longer ends of the two plates, c. the orifice in each plate on the side facing away from the sealing face of the plate extends into a boss on the plate and the bush associated with each plate is formed with an appropriately shaped socket for the reception of the boss.

The off-center location of the orifices in the two plates and the use of the two longer ends for closing the orifice in the cooperating plate provide the maximum possible sealing overlap with the aid of plates of minimum lengths. This optimum utilization of the contacting sliding surfaces for sealing means that the orifices in the cooperating plates are an optimum distance apart when the sliding gate is closed. A reliable seal is therefore still obtained when considerable erosion has already occurred at the orifice edges where the flowing metal is deflected whenever the sliding gate is in a partly open position. Furthermore, owing to this optimum utilization of the sliding surfaces, plates of smaller overall dimensions can be used to achieve a comparatively equally good sealing effect as hitherto, and this means a considerable saving in valuable high grade refractory wearing material. Moreover, relatively small dimensions of the sliding gate are more in accordance with the restricted space usually available in continuous casting machines.

The feature according to which the orifice in the baseplate extends into the entry bush and the orifice in the sliding plate extends into the exit bush in a boss which is received into an appropriately shaped socket in the respective bush substantially contributes to improved operating safety because the joints of the wearing parts are thus located in the bushes where they are outside the zone of action of the vortices of the outflowing metal when the sliding gate is in a partly open position. Erosion at the surfaces of the joints between the plates and the bushes which are preferentially attacked by the flowing metal is thus minimized.

Generally considered, the proposals according to the invention create safer conditions at points of the wearing parts of the sliding gate that are exposed to the heaviest attack and at the same time the dimensions of the bedplate and of the sliding plate may be such that a considerable saving in valuable high-grade refractory material can be achieved.

A further object of the invention consists in providing entry and exit bushes and/or sliding plates and bedplates that are of like shape and dimensions. On the one hand this simplifies the production of the wearing parts because production can be limited to fewer items which can be cheaply and well made by mass production methods with a reduced percentage of rejects and with a minimum expenditure in machines and tools. On the other hand stockkeeping by the user is also facilitated. Finally, assembly and repair work at the siding gate nozzle can be rapidly performed, the risk of faulty assembly using the wrong parts being eliminated, and the cost of idle time in the foundry being reduced.

Figure 2A:
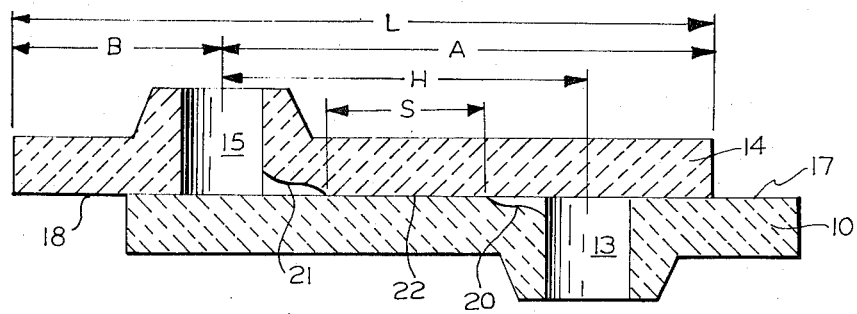
Figure 3:
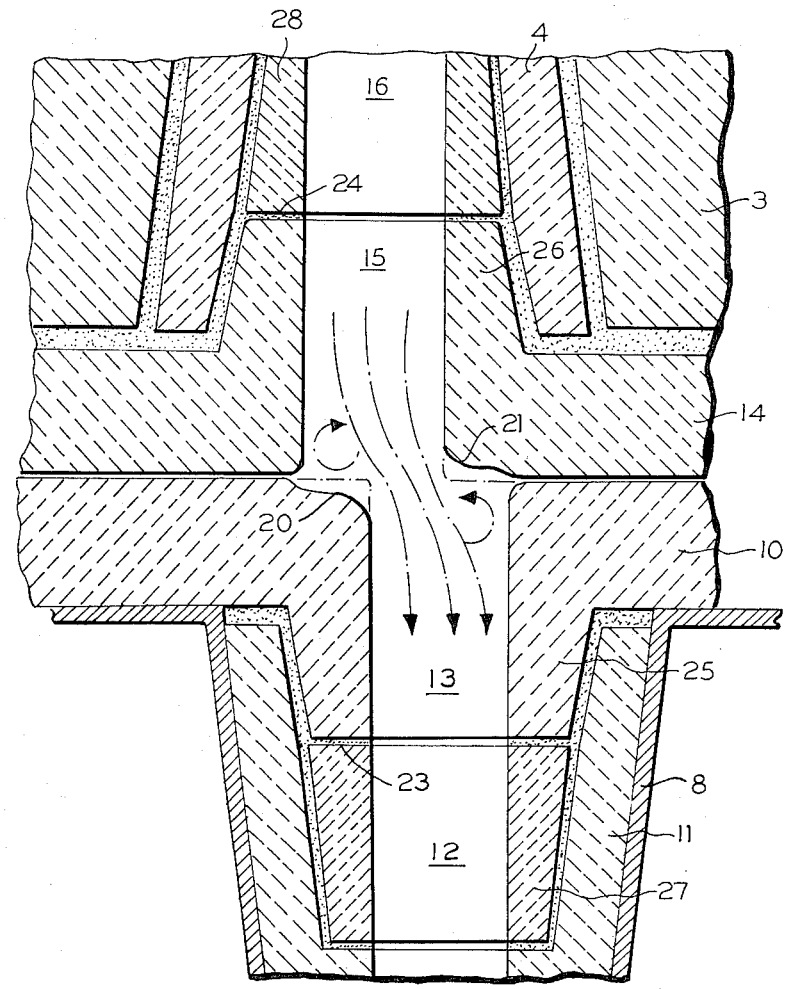

With the above and other objects in view which will become apparent from the detailed description below, a preferred embodiment of the invention is shown in the drawings, in which:

FIG. 1 is a longitudinal section of a sliding gate nozzle according to the invention, FIG. 2a and b are pairs of plates in closing position, likewise in longitudinal section and FIG. 3 is a fragmentary longitudinal section of a sliding gate nozzle in partly closed position.

The pouring vessel of which FIG. 1 shows only the outlet nozzle has a sheet metal casing 1 and a refractory brick lining 2. Casing and lining are provided with an opening containing an orifice brick 3 which in turn contains an entry bush 4.

Secured to the casing 1 of the vessel is a sliding gate nozzle which comprises a metal case 5, a metal cover 6 containing a slideway 7 for a likewise metal slider 8 capable of being moved to and fro by an operating rod 9. The slider 8 carries a sliding plate 10 as well as an exit bush 11. The cylindrical bore 12 of this bush is coaxial with an orifice 13 of the same diameter in the sliding plate 10 and the two parts are connected together by an interfitting boss and socket.

Above the sliding plate 10 is a stationary bedplate 14 which has an orifice 15 that likewise axially aligns with the bore 16 of the entry bush 4 inserted into the orifice brick 3 of the pouring vessel, the two parts being similarly connected together by an interfitting boss and socket.

It will be clearly understood from the drawing that the parts 4 and 11 as well as the parts 10 and 14, which are wearing parts, are identical and thus interchangeable.

For replacing the wearing parts 4, 11, 10 and 14 the cover 6 is detached from the case 5, the worn parts are removed and the fresh parts assembled and bonded in position with mortar. The entry bush is firmly bedded in mortar in the orifice brick. When the cover 6 is refitted to the case 5 care is taken to ensure that the carefully prepared cooperating sealing surfaces 17 and 18 of the sliding plate and the bedplate 14 make contact with a certain amount of contact pressure.

Figure 2B:
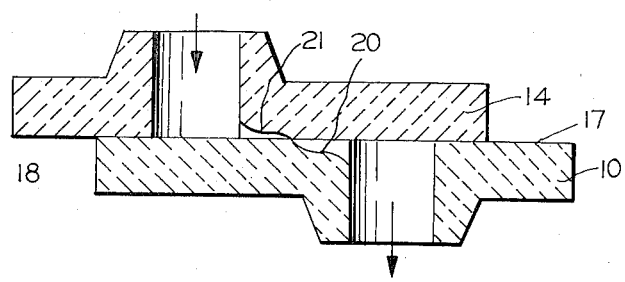

FIGS. 2a and b are two embodiments of a pair of plates in closed position after having been typically worn by erosive action of the metal. This type of erosion occurs principally when the gate is only partly open. FIG. 2b indicates that towards the end of a pouring cycle a breakthrough of liquid metal and leakage where the plates have worn at 20 and 21 has only been prevented because the plates 10 and 14 are short. On the other hand, FIG. 2a illustrates that when the orifices 13 and 15 in the plates are considerably longitudinally off center or when the ends of the plates 10 and 14 which seal the cooperating orifice are lengthened and the operating stroke of the sliding gate is correspondingly longer, the sealing zones 22 which effectively remain between the cooperating sealing faces 17 and 18 are very much longer after considerable wear and that operating safety is accordingly better.

It transpires that between the two extremes shown in FIGS. 2a and b the following dimensions appear to be technically and economically good:

Length of plate L: 300 mm 420 mm

Longer plate end A: 180 mm 280 mm
Shorter plate end B: 120 mm 140 mm
Operating stroke of sliding gate H: 120 mm 180 mm
Maximum diameter of flow opening dmax.: 60 mm 80 mm
Minimum diameter of flow opening dmin.: 25 mm 35 mm Generally speaking the distance S should be 0.5 to 1.5 times the diameter d, depending upon the expected rate of wear.

The diameter of the orifices 13 and 15 through the plates 10 and 14 will vary according to the desired pouring performance. The plates may be tar-impregnated and the sliding faces should be ground flat to an accuracy of about 0.15 mm.

FIG. 3 illustrates a number of important details of the sliding gate nozzle according to the invention. The plates 10 and 14 are shown in part open throttling position and the wear of the two plates 10 and 14 due to erosion is indicated at 20, and 21. The probable streamlines of the flowing metal and the vortices that form are also shown in the drawing.

For technical reasons it is in practice impossible to produce a sliding plate 10 together with an exit bush 11 and a bedplate 14 together with an entry bush in the form of two integral components. The presence of joints 23 and 24 between the plates and the bushes is therefore practically unavoidable. In conventional sliding gate nozzles in which the plates 10 and 14 are of the customary normal thickness and flat contiguous faces of plates and bushes abut, these joints are weaknesses from the point of view of operating safety. For instance, the joint 24 between the bedplate 14 and the entry bush 4 is exposed to the full ferrostatic head when the gate is partly or fully closed, whereas the joint 23 between the sliding plate 10 and the outlet bush 11 is exposed to a powerful vortex caused by the deflection of the streaming metal out of the vertical when the gate is only partly open.

For this reason an arrangement that has proved extremely useful consists in forming the plates 10 and 14 with bosses 25 and 26 on the sides facing away from their sliding faces 17 and 18 and thereby to lengthen as much as possible the distance of the two joints 23 and 24 from the plate of sliding cooperation of the two plates. An axial distance of preferably one to two times the diameter of the orifices 12, 13, 15 and 16 is desirable. In such a case satisfactory operating results are achieved although the boss 26 of the bedplate 14 facing the incoming metal is in fact contrary to hitherto accepted good practice.

FIG. 3 also illustrates that it may sometimes be an advantage to provide the two bushes 4 and 11 with relatively short inserts 27 and 28 of some other material typically a material having a very high alumina content is normally used for the two bushes 4 and 11. This has the drawback that the temperature drop in the metal from the ladle to the nozzle exit is undesirably high because of the high conductivity of this type of material. In such a case the combination of a bush 4 and 11 of lower thermal conductivity with an insert 27 and 28 of a highly corrosion-resistant corundum material may be advantageous.

I Claim:

1. A sliding gate assembly for a vessel for pouring metals having replaceable refractory wearing parts comprising a casing having an outlet, an entry bush mounted in said outlet; a stationary bedplate fixed to said casing, said bedplate having first and second longitudinal ends, said first end being longer than said second end, and a bedplate orifice located at the junction of said first and second ends and thus being offset from the longitudinal center of the bedplate, said bedplate orifice being aligned with said outlet; a sliding plate positioned adjacent said bedplate for controlling the flow of metal through said bedplate orifice, said sliding plate also having first and second longitudinal ends, said first end being longer than said second end, a sliding plate orifice located at the junction of said first and second ends and thus being offset from the longitudinal center of said sliding plate, and an exit bush mounted on said sliding plate aligned with said sliding plate orifice; said first ends of said plates having sealing faces; means for moving said sliding plate to either a first position wherein said two orifices are in alignment or to a second position wherein said bedplate orifice is sealed by said first end of said sliding plate and said sliding plate orifice is sealed by said first end of said bedplate; a boss at the orifice in each of said plates located on the side facing away from the sealing face of the plate, said entry bush having a socket for receiving the boss on said bedplate and said exit bush having a socket for receiving the boss on said sliding plate; said entry and exit bushes having the same shape and dimensions so as to be interchangeable with each other; and said sliding plate and said bed plate having the same shape and dimensions so as to be interchangeable with each other.

\* \* \* \* \*